United States Patent Office 3,232,068
Patented Feb. 1, 1966

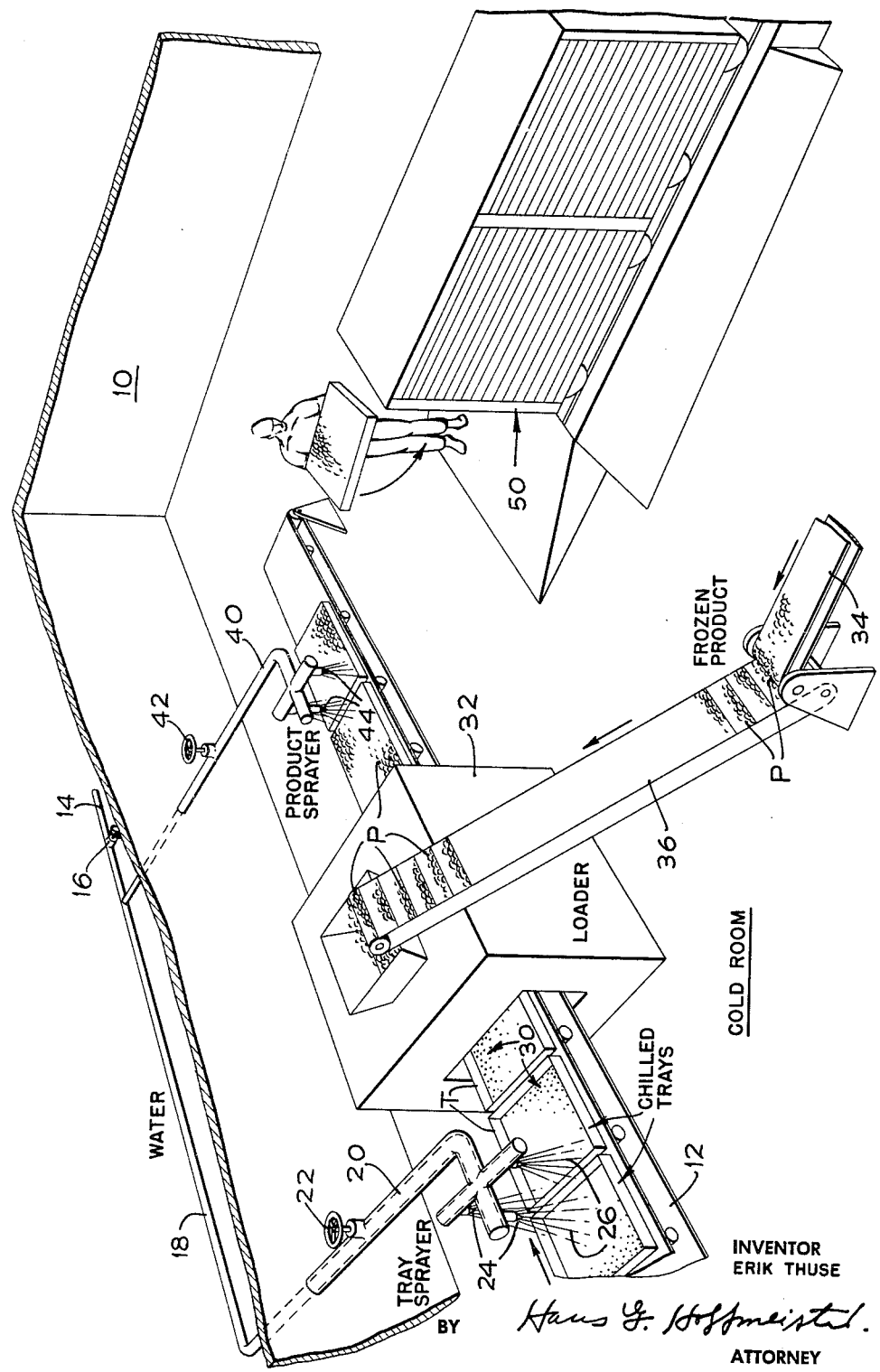

3,232,068
LOADING FREEZE DRYERS
Erik Thuse, San Jose, Calif., assignor to FMC Corporation, San Jose, Calif., a corporation of Delaware
Filed Apr. 17, 1964, Ser. No. 360,670
5 Claims. (Cl. 62—56)

This invention relates to freeze drying, and more specifically to a process for loading a frozen product to be dried into trays of the type which are placed in a freeze drying chamber, for freeze drying the frozen product in the trays.

In many freeze drying operations, large shallow trays are provided for holding a relatively thin layer of the product to be dried during the drying operations. These trays my be over 3 feet square in lateral dimension, with rim flanges in the order of 1" high, and are loaded with products such as berries, mushrooms, etc., usually while these products are in a prefrozen condition. These trays of frozen products are then introduced into the freeze drying chamber, where they usually rest on heating shelves or the like, or the trays may be introduced into special cars such as that disclosed in the patent to Abbott et al. No. 3,132,930, dated May 12, 1964, and assigned to the assignee of the present invention.

Usually, the loaded trays are manually transferred from the loading area to the freeze drying chamber or to the cars referred to. Since the trays are large and shallow, it is difficult to keep them level during the tray transfer process. Ordinary frozen products, such as berries or the like, have a very low coefficient of friction with the trays, namely a coefficient in the order of 0.13. If the trays are inadvertently inclined by the operator during the tray transfer operation by just a few degrees, often as little as five degrees, the product shifts on the trays, piles up on the low side thereof, and becomes unevenly distributed. Some of the product might even spill out of the trays and be lost. Even if the product is unevenly distributed but remains in the trays, the freeze drying process is not as suspectible to uniform control, as it is if the products in the trays are completely level when placed in the drying unit.

It is an object of the present invention to facilitate the placement of product loaded trays into a freeze drying chamber, car, or the like, with the product being level, unshifted, and undisturbed in the trays, when the trays are finally disposed at their destination.

It is another object of the present invention to increase the co-efficient of friction between the frozen product and the trays.

A further object of the invention is to restrict shifting of the product on the trays during the tray transfer opertion in the manner referred to, without substantially increasing the sublimation load on the freeze drying system during the subsequent freeze drying operation.

Still another object of the present invention is to still further assist in maintaining the product level in the trays by spraying a fine fog of water onto the surface of the loaded product in the trays.

The manner in which these and other objects of the present invention may be accomplished will be apparent from the following detailed description of the invention.

The single drawing figure illustrates a system for carrying out the process.

Referring to the drawing, the loaded system of the present invention is disposed in a cold room 10, which is at a temperature substantially below the freezing temperature of water, such as a temperature of 0° F. In the cold room 10 is a conveyor 12, for conveying the trays T. The conveyor 12 may be of any conventional design, the details of which are not part of the invention, and hence are not illustrated. The conveyor 12 is power driven through a conventional variable speed transmission (not shown).

The trays T are square or rectangular trays, and they are quite shallow. In a typical installation they may be 40" to 46" in either dimension, and 1" deep. The trays T will have been prechilled, usually by stacking them in the cold room 10. If the conveyor 12 is long enough, the trays can be warm when placed on the conveyor, and will become chilled before reaching the spray nozzles.

In order to provide a thin film of ice on the trays in accordance with the present invention, a source of water 14, which is above freezing in temperature, is controlled by a valve 16 and directed by a pipe 18 into the cold room 10. In the cold room the water pipe has an insulated section 20. The insulated section 20 of the pipe contains a shut-off and flow control valve 22. The insulated section of pipe 20 terminates in a plurality of nozzles 24 disposed above the trays T, as they move along the conveyor 12. These nozzles form a fine mist, spray, or fog of water 26, which is deposited on the loading surfaces of the trays T. The fog nozzles and fine spray nozzles suitable for this service are well known in the art and the details do not form part of the present invention. A suitable nozzle is supplied by the W. M. Steinen Mfg. Co. of Newark, New Jersey, as their type Mist Jet nozzle.

The speed of the conveyor 12 and the quantity of water admitted by the valve 22 are relatively selected so that the amount of water deposited on the trays is very small. As soon as the spray of water strikes the chilled trays, it freezes into a very thin layer of ice, indicated at 30. In accordance with the invention, the conveyor speed and the spray rate of the water is adjusted so that the layer of ice 30 is only a few thousandths of an inch thick. Being very thin, this layer adds substantially no weight to the trays for handling, and represents an insignificant additional load on the freeze drying system during the sublimation process.

The chilled trays, bearing a coating 30 of ice, then pass through a loader 32. The loader receives frozen products P from conveyors 34, 36 and distributes these products uniformly on the chilled and iced trays. The details of the loader and the feed thereof are not part of the present invention and hence, are not illustrated. In fact, the frozen products P could be loaded on the trays by hand, within the scope of the present invention.

After leaving the loader 32, the product laden trays are ready for insertion into the freeze drying chamber or into a car 50 illustrated in the drawing, which car in turn is pushed into a freeze drying chamber. The car 50 has shelves for supporting the loaded trays T.

This transfer of trays must be done manually, and as previously mentioned, it is difficult to maintain the trays level within the few degrees required to prevent shifting of the products P, unless the process of the present invention has been employed. In the present invention, tests have shown that the ice to ice coefficient of friction between the ice layer 30 on the tray and the frozen product P, is sufficient to prevent slippage of the product along the trays until the trays are tilted more than 31°. This unexpectedly high coefficient of friction, which amounts to about 0.60, greatly facilitates the operator's handling of the trays during transfer from the conveyor to the freeze drying chamber, or to the freeze drying car. As mentioned, the frozen product starts slipping on uncoated trays at a tilt angle of about 5°.

With some products it may be desirable to deposit a second very thin film of ice over the surface of the frozen product which has been loaded in the trays. When this is done, a second insulated water pipe section 40 is provided in the cold room, having a control valve 42, and a plurality of spray nozzles 44. This spray system is located downstream of the loader so that the frozen, loaded products P receive a thin mist or fog of water, which instantly is transformed into a very thin layer of ice, just in the manner in which the ice layer 30 was formed on the tray surfaces. The handling of some products such as strawberries or the like may be even further facilitated by this second water spray, but the principal advantage of the present invention is usually obtained solely by the deposition of the ice layer 30 on the loading surfaces of the trays.

Having completed a detailed description of the invention so that those skilled in the art may practice the same I claim:

1. The method of loading trays for freeze drying comprising the steps of chilling the trays to a temperature that is substantially below 32° F., spraying a mist of water on the loading surfaces of the chilled trays to form a very thin layer of ice on the surface, and loading frozen products on the iced trays preparatory for freeze drying the products.

2. The method of loading trays for freeze drying comprising the steps of chilling the trays to a temperature that is substantially below 32° F., spraying a mist of water on the loading surfaces of the chilled trays to form a layer of ice on the surface, that is a few thousandths of an inch thick, and loading frozen products on the iced trays preparatory for freeze drying the products.

3. The method of loading trays for freeze drying comprising the steps of chilling the trays in a cold room that is at a temperature well below 32° F. to bring the tray temperature substantially below 32° F., placing the trays on a conveyor in the cold room, spraying a mist of water on the loading surfaces of the moving chilled trays to form a very thin layer of ice on the tray surfaces, and loading frozen products in the cold room on the iced trays preparatory for freeze drying the products.

4. The method of loading trays for freeze drying comprising the steps of chilling the trays to a temperature that is substantially below 32° F., spraying a mist of water on the loading surfaces of the chilled trays to form a very thin layer of ice on the surfaces, loading frozen products on the iced trays, and spraying a mist of water on the surfaces of the loaded frozen products to form a very thin layer of ice thereon, preparatory for freeze drying the products.

5. The method of loading trays for freeze drying comprising the steps of chilling the trays in a cold room that is at a temperature well below 32° F. to bring the tray temperature substantially below 32° F., placing the trays on a conveyor in the cold room, spraying a mist of water on the loading surfaces of the moving chilled trays to form a very thin layer of ice on the surfaces, loading frozen products in the cold room on the iced trays and spraying a mist of water on the surfaces of the loaded frozen products to form a very thin layer of ice thereon, preparatory for freeze drying the products.

References Cited by the Examiner
UNITED STATES PATENTS

| | | | |
|---|---|---|---|
| 1,769,088 | 7/1930 | Vucassovieh | 62—62 X |
| 3,003,326 | 10/1961 | McDonald | 62—162 |

EDWARD J. MICHAEL, *Primary Examiner.*